(12) United States Patent
Rahman et al.

(10) Patent No.: US 11,010,158 B2
(45) Date of Patent: May 18, 2021

(54) DETERMINING THE AVAILABILITY OF MEMORY OPTIMIZATIONS BY ANALYZING A RUNNING BINARY

(71) Applicant: Facebook, Inc., Menlo Park, CA (US)

(72) Inventors: Jason P. Rahman, Seattle, WA (US); Daniel J. Reif, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 44 days.

(21) Appl. No.: 15/814,156

(22) Filed: Nov. 15, 2017

(65) Prior Publication Data
US 2019/0146786 A1    May 16, 2019

(51) Int. Cl.
*G06F 8/77* (2018.01)
*G06F 3/06* (2006.01)

(52) U.S. Cl.
CPC .............. *G06F 8/77* (2013.01); *G06F 3/0604* (2013.01); *G06F 3/0653* (2013.01); *G06F 3/0673* (2013.01)

(58) Field of Classification Search
CPC .. G06F 8/443; G06F 11/3466; G06F 11/3612; G06F 11/073; G06F 11/3409; G06F 8/77; G06F 3/0673; G06F 3/0604; G06F 3/0653; G06F 8/4434
See application file for complete search history.

(56) References Cited

U.S. PATENT DOCUMENTS

| | | | | |
|---|---|---|---|---|
| 6,311,324 B1* | 10/2001 | Smith | ............... | G06F 11/3409 714/E11.192 |
| 7,472,262 B2* | 12/2008 | Sun | ............... | G06F 12/0891 711/213 |
| 7,590,806 B2* | 9/2009 | Harris | ............... | G06F 8/443 711/154 |
| 7,660,962 B2* | 2/2010 | Tseytin | ............... | G06F 11/3466 711/161 |
| 2003/0145314 A1* | 7/2003 | Nguyen | ............... | G06F 8/4442 717/158 |
| 2004/0216097 A1* | 10/2004 | Sun | ............... | G06F 12/0891 717/154 |
| 2007/0143360 A1* | 6/2007 | Harris | ............... | G06F 8/443 |
| 2007/0143558 A1* | 6/2007 | Tseytin | ............... | G06F 11/3466 711/170 |
| 2010/0169861 A1* | 7/2010 | Wang | ............... | G06F 8/443 717/110 |
| 2013/0268921 A1* | 10/2013 | Brauneis | ............... | G06F 8/4434 717/158 |

\* cited by examiner

*Primary Examiner* — S. Sough
*Assistant Examiner* — Cheneca Smith
(74) *Attorney, Agent, or Firm* — Van Pelt, Yi & James LLP (57) ABSTRACT

A copy of memory data content in at least a portion of computer memory utilized by a computer process during execution is obtained. An entropy of at least a portion of the obtained memory data content is determined. A memory data entropy metric based at least in part on the determined entropy of at least the portion of the obtained memory data content is calculated and a computer code portion associated with the memory data entropy metric is identified.

20 Claims, 7 Drawing Sheets

DETERMINING THE AVAILABILITY OF MEMORY OPTIMIZATIONS BY ANALYZING A RUNNING BINARY

BACKGROUND OF THE INVENTION

As software is written and developed, the complexity of the software typically grows. Each introduction of new changes and features creates the possibility of breaking existing features. In many situations, when changes to the software code base are introduced, the new code base is compiled and a series of tests are performed on the build. These tests are run to confirm that the new changes do not break existing features. New tests may also be introduced to confirm that the newly introduced features function properly. In some situations and in particular when many different software developers are working on the same code base, it is easy to introduce redundant or duplicative code or data. In the event redundant or duplicative code or data is introduced, the size of the binary may increase significantly and require additional resources such as more memory. In some scenarios, a change to the existing code base magnifies an existing problem associated with redundant or duplicative code or data. Therefore, there exists a need to help identify the availability of memory optimizations for a software program.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Determining the availability of memory optimizations for a running binary is disclosed. For example, an entropy calculation is performed on a running binary to determine an entropy metric. The entropy metric may be calculated by performing an entropy calculation on a copy of the memory data associated with the binary program and comparing the result with baseline entropy evaluations. The entropy metric, along with additional environmental settings, is stored and compared to baseline and historic entropy evaluations. In the event the newly calculated entropy metric exceeds a threshold based on baseline evaluations, a determination is made that there are likely available memory optimizations. For example, in the event a new change to a software code base introduces redundant or duplicative code or data, the entropy calculation on the running binary will return with a result that the entropy decreased due to the repetitive characteristics of the newly introduced code. A trace may be performed to map the areas of potential memory optimizations back to the computer code that introduced the memory inefficiency. In this manner, a software developer is made aware of the potential of available memory optimizations and source code locations where the optimizations may be addressed.

In some embodiments, a copy of the memory data in at least a portion of computer memory utilized by a computer process during execution is obtained. For example, a running binary associated with a computer process is associated with a portion of computer memory. A copy of the portion of the computer memory associated with the running binary is obtained, for example, by making a copy of that portion of memory. The entropy of at least a portion of the obtained memory data content is determined. For example, an entropy determination is made on one or more portions of the memory data associated with the running binary. As one example, an entropy determination may be performed on the memory data associated with the text segment of the running binary. In various embodiments, an entropy determination may be performed on the memory data associated with the data segment, stack segment, heap segment, or other available memory segment of the running binary. In some embodiments, the entropy determination is based on the entire running binary or one or more segments of memory. In some embodiments, the entropy determination relies on a compression algorithm to determine the entropy of the memory segment. For example, the higher the compression ratio of the binary program the lower the entropy of the binary program. Based at least in part on the determined entropy of the obtained memory data content, a memory data entropy metric is calculated. For example, the entropy determination is utilized to create an entropy metric. In various embodiments, an entropy metric is a form of the entropy determination that is useful for utilizing the entropy determination to provide feedback to software developers. For example, the entropy metric may be utilized for comparison to past entropy metrics. In some embodiments, the entropy metric is based on the delta of the current entropy determination with past or baseline entropy determinations.

In the event the memory data entropy metric meets a criteria, a computer code portion associated with the memory data entropy metric is identified. For example, in the event new changes to the software decrease the entropy of the binary, the memory data entropy metric may meet a criteria, such as the current entropy of the running binary may be less than the average past entropy by a certain threshold. By not meeting the threshold associated with average past entropy, a determination is made that a memory optimization is available. In some embodiments, using a source code object and/or data structure to memory mapping, the location of the memory optimization is traced back to the source code. One or more locations in the source code and/or locations associated with certain objects or data structures are identified as potential causes of memory redundancy and/or duplication. By identifying a computer code portion associated with the memory data entropy metric, a software developer has the opportunity to review specific source code portions for potential memory optimizations.

Figure 1:
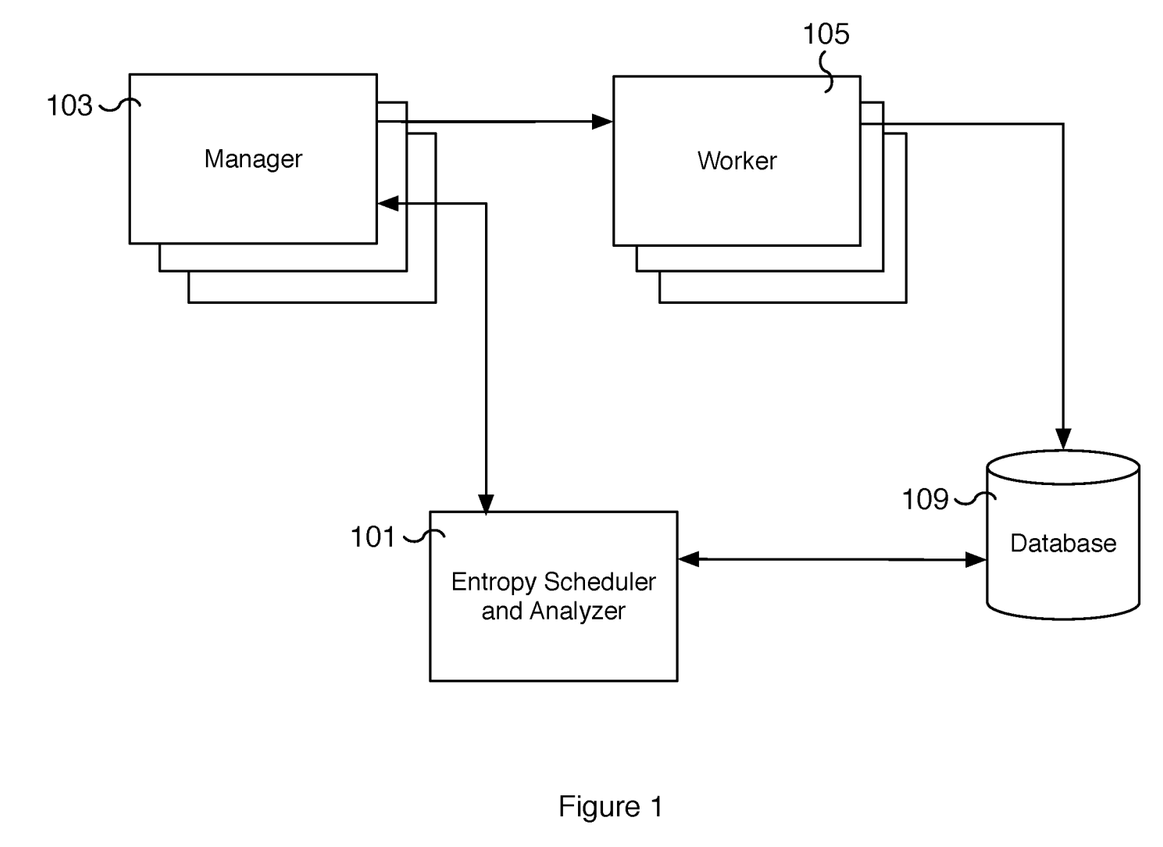
FIG. 1 is a block diagram illustrating an example of a software development environment for identifying the availability of memory optimizations.

FIG. 1 is a block diagram illustrating an example of a software development environment for identifying the availability of memory optimizations. In various embodiments, the entropy metric may be calculated by integrating an entropy determination into a continuous integration project and development environment. In some embodiments, the entropy calculation is performed on deployed running binaries outside of a continuous integration environment. In the example shown, Entropy Scheduler and Analyzer 101 communicates with Manager 103 with Worker 105. In the event a new source code check-in is made, Entropy Scheduler and Analyzer 101 is triggered to measure the entropy of the new binary associated with the code check-in. In some embodiments, Entropy Scheduler and Analyzer 101 works with or is part of a continuous integration environment. In some embodiments, a continuous integration environment may utilize Entropy Scheduler and Analyzer 101 to initiate entropy testing. Once a determination is made to initiate entropy testing, Entropy Scheduler and Analyzer 101 communicates with Manager 103. Manager 103 distributes the compiled binary and associated tests, which may include one or more entropy tests along with other traditional tests such as unit and regression tests. The binary and entropy tests are distributed by Manager 103 to Worker 105. In various embodiments, Worker 105 is a computer system such as the programmed computer system of FIG. 2. In some embodiments, the computer system is a virtualized computer system. Worker 105 runs the test distributed by Manager 103 on the binary it receives. In various embodiments, the newly built binary is run on Worker 105 and the entropy of the binary is measured utilizing Worker 105. In some embodiments, Worker 105 runs a binary instrumented with the code needed to initiate the execution of the entropy measurement. In some embodiments, Worker 105 runs a kernel modified to run the entropy measurement on the process associated with the running binary. Database 109 is storage for storing the entropy measurement and other associated results. For example, the entropy measurement, the build name, the build time and date, the commit information associated with the build, and other appropriate data are stored in Database 109. In some embodiments, identifying characteristics of the running environment are stored in Database 109 and are part of the entropy results. In some embodiments, Database 109 is a time series database.

In the example shown, Entropy Scheduler and Analyzer 101 further communicates with Database 109 to retrieve stored entropy measurements. In some embodiments, past entropy measurements including baseline entropy evaluations are stored in Database 109. Entropy Scheduler and Analyzer 101 analyzes the entropy of the running binary on Worker 105 and provides the appropriate feedback. In the event a memory optimization is determined to be available, Entropy Scheduler and Analyzer 101 identifies the portion of computer code associated with a potential memory optimization. In some embodiments, Entropy Scheduler and Analyzer 101 identifies the portion of computer code by tracing the location of the memory where the entropy metric meets a criteria using an object/data structure to memory mapping. In various embodiments, the techniques for tracing the memory optimization to the source code depend on the source language and environment of the binary.

In various embodiments, the running environment of the binary is stored so that it may be later retrieved and used for a different binary. For example, the environment used for a past binary may be restored and used for a new binary to eliminate the running environment as a source for memory inefficiencies. In some embodiments, old binaries may be re-run in a modern environment to calculate an entropy for the old binary using the different running environment.

In some embodiments, past results are viewed over time to determine an entropy trend. In some scenarios, the initial introduction of inefficient source code is difficult to detect due to the small change in entropy. However, as the inefficient source code is increasingly utilized, the magnitude of the inefficiency often increases. By viewing the change in entropy over time, an inflection point can be determined that corresponds to the initial introduction of the inefficient source code. Moreover, the inflection point is used to identify the original commit corresponding to the introduction of the inefficient source code. In some embodiments, feedback is provided to the software developer on the location of the source code where the memory inefficiency is introduced.

As shown in FIG. 1, the software development environment of FIG. 1 may include multiple managers such as Manager 103 and multiple workers such as Worker 105. For example, additional instances of a worker may be available for running one or more tests simultaneously. Similarly, one or more instances of a manager may be available for distributing binaries and tests for multiple workers. In some embodiments, Database 109 may be one or multiple storage mediums such as multiple databases and/or distributed databases.

Figure 2:
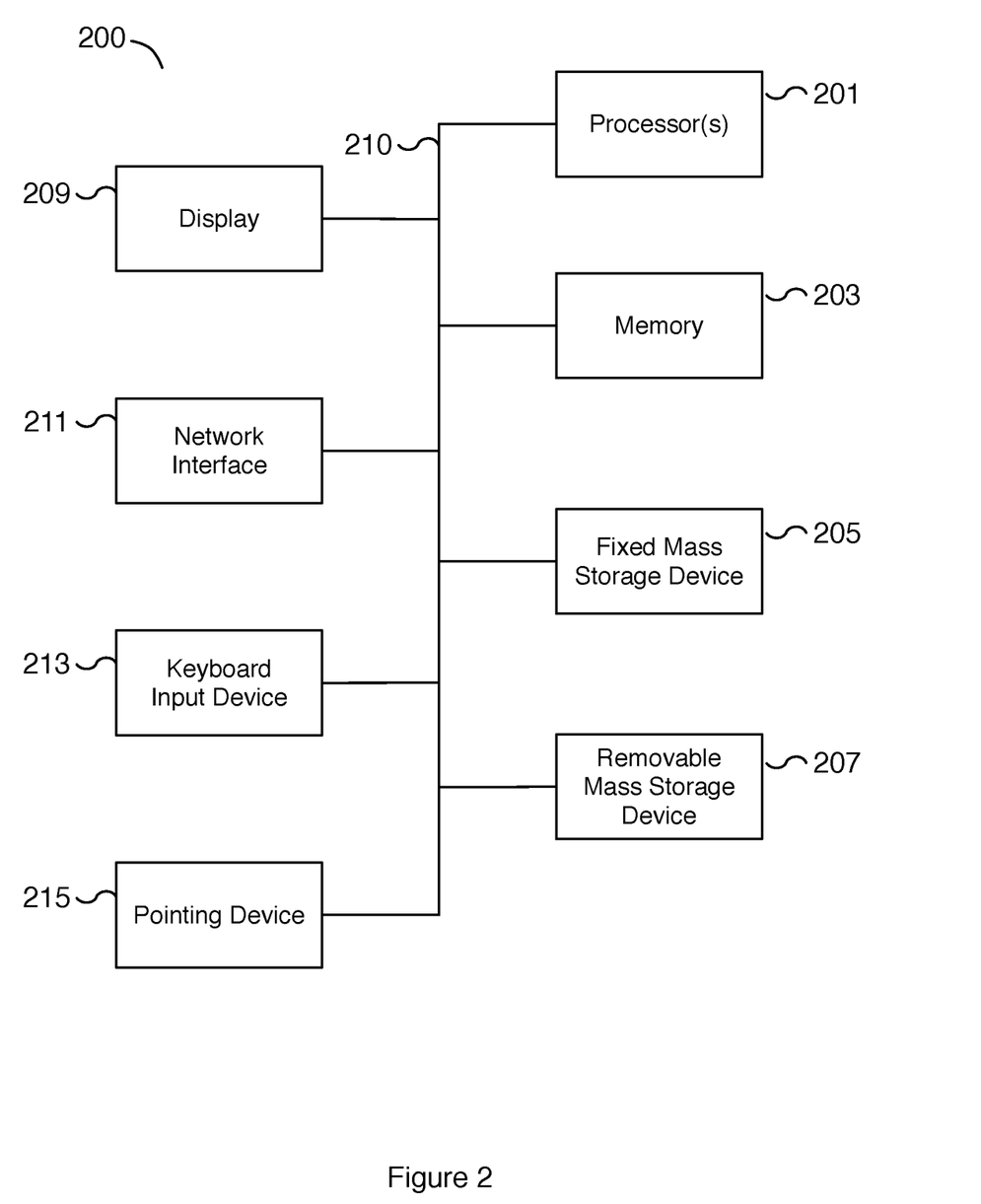
FIG. 2 is a functional diagram illustrating a programmed computer system for identifying the availability of memory optimizations.

FIG. 2 is a functional diagram illustrating a programmed computer system for identifying the availability of memory optimizations. As will be apparent, other computer system architectures and configurations can be used for determining the availability of memory optimizations by analyzing a running binary. In some embodiments, computer system 200 is a virtualized computer system providing the functionality of a physical computer system. Computer system 200, which includes various subsystems as described below, includes at least one microprocessor subsystem (also referred to as a processor or a central processing unit (CPU)) 201. For example, processor 201 can be implemented by a single-chip processor or by multiple processors. In some embodiments, processor 201 is a general purpose digital processor that controls the operation of the computer system 200. Using instructions retrieved from memory 203, the processor 201 controls the reception and manipulation of input data, and the output and display of data on output devices (e.g., display 209). In some embodiments, processor 201 includes and/or is used to provide functionality for determining an entropy of a running binary and identifying available memory optimizations. In some embodiments, computer system 200 is used to provide elements 101, 103, and/or 105 of FIG. 1. In some embodiments, processor 201 performs the processes described below with respect to FIGS. 3-7.

Processor 201 is coupled bi-directionally with memory 203, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 201. Also as is well known in the art, primary storage typically includes basic operating instructions, program code, data, and objects used by the processor 201 to perform its functions (e.g., programmed instructions). For example, memory 203 can include any suitable computer-readable storage media, described below, depending on whether, for example, data access needs to be bi-directional or uni-directional. For example, processor 201 can also directly and very rapidly retrieve and store frequently needed data in a cache memory (not shown).

A removable mass storage device 207 provides additional data storage capacity for the computer system 200, and is coupled either bi-directionally (read/write) or uni-directionally (read only) to processor 201. For example, storage 207 can also include computer-readable media such as flash memory, portable mass storage devices, magnetic tape, PC-CARDS, holographic storage devices, and other storage devices. A fixed mass storage 205 can also, for example, provide additional data storage capacity. Common examples of mass storage 205 include flash memory, a hard disk drive, and an SSD drive. Mass storages 205, 207 generally store additional programming instructions, data, and the like that typically are not in active use by the processor 201. Mass storages 205, 207 may also be used to store user-generated content and digital media for use by computer system 200. It will be appreciated that the information retained within mass storages 205 and 207 can be incorporated, if needed, in standard fashion as part of memory 203 (e.g., RAM) as virtual memory.

In addition to providing processor 201 access to storage subsystems, bus 210 can also be used to provide access to other subsystems and devices. As shown, these can include a display 209, a network interface 211, a keyboard input device 213, and pointing device 215, as well as an auxiliary input/output device interface, a sound card, speakers, additional pointing devices, and other subsystems as needed. For example, the pointing device 215 can be a mouse, stylus, track ball, or tablet, and is useful for interacting with a graphical user interface.

The network interface 211 allows processor 201 to be coupled to another computer, computer network, or telecommunications network using one or more network connections as shown. For example, through the network interface 211, the processor 201 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 201 can be used to connect the computer system 200 to an external network and transfer data according to standard protocols. For example, various process embodiments disclosed herein can be executed on processor 201, or can be performed across a network such as the Internet, intranet networks, or local area networks, in conjunction with a remote processor that shares a portion of the processing. Additional mass storage devices (not shown) can also be connected to processor 201 through network interface 211.

An auxiliary I/O device interface (not shown) can be used in conjunction with computer system 200. The auxiliary I/O device interface can include general and customized interfaces that allow the processor 201 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above and magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 2 is but an example of a computer system suitable for use with the various embodiments disclosed herein. Other computer systems suitable for such use can include additional or fewer subsystems. In addition, bus 210 is illustrative of any interconnection scheme serving to link the subsystems. Other computer architectures having different configurations of subsystems can also be utilized.

Figure 3:
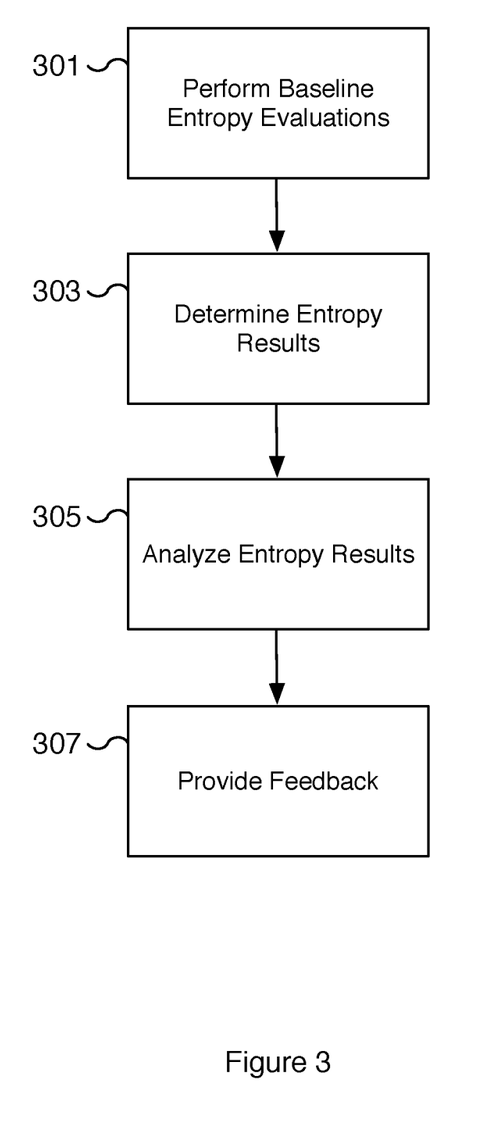
FIG. 3 is a flow diagram illustrating an embodiment of a process for identifying the availability of memory optimizations.

FIG. 3 is a flow diagram illustrating an embodiment of a process for identifying the availability of memory optimizations. In some embodiments, the process of FIG. 3 is initiated by and/or implemented by Entropy Scheduler and Analyzer 101, Manager 103, and Worker 105 of FIG. 1. In various embodiments, the process of FIG. 3 may be used to identify the availability of memory optimizations by determining the entropy of a running binary. By comparing the entropy of a running binary to entropy results of past binaries, a determination is made on whether memory optimizations are available. For example, a new binary with a lower entropy than past binaries indicates that the new binary is not as efficient in its use of memory and/or contains more redundant or duplicative data. Feedback on whether memory optimizations are available is provided to the software developer to aid in identifying inefficient use of memory.

In the example shown, at 301, baseline entropy evaluations are performed. In various embodiments, baseline entropy evaluations are performed to use as a baseline for comparing new binaries. In some embodiments, one or more binaries are used to create a baseline entropy evaluation. An ideal binary may be a program written in the same programming language and targeted to run in the same environment as new binaries. The ideal binary is a well-designed non-trivial binary created using similar design principles as new binaries. In some embodiments, ideal binaries are developed using the same software techniques, design patterns, and/or language as the new binaries to be tested. In some embodiments, more than one ideal binary is created. Once one or more ideal binaries are created, the entropy of the binaries is calculated to determine a baseline evaluation. In various embodiments, the baseline entropy evaluations generate a range, instead of a specific entropy, that is appropriate for identifying available memory optimizations.

At 303, entropy results are determined for a new binary. For example, entropy results are determined for a binary to identify potential memory optimizations. In some embodiments, the binary is built when source code changes are committed to a software project. For example, when a software source code check-in is committed to a source code repository, a continuous integration environment, such as the software development environment of FIG. 1, builds a binary that reflects the new state of the source code repository. The binary is run and unit and regression tests are performed. In various embodiments, as part of a continuous integration environment, entropy testing is performed. In various embodiments, the entropy results include both a measurement of the entropy of the binary and additional entropy results such as the running environment of the binary and a source code commit identifier to map the binary to source code changes. In some embodiments, the entropy results are determined using the binary running on Worker 105 and stored in Database 109 of FIG. 1.

At 305, the entropy results are analyzed. For example, the entropy of the binary calculated at 303 may be compared to the baseline entropy evaluations performed at 301. In some embodiments, an entropy metric is determined based on the entropy results. For example, in some embodiments, an entropy metric is calculated that corresponds to the change in entropy between the current binary and baseline evaluations. In the event the metric meets a certain criteria, a determination is made that memory optimizations are available. In the event the metric does not meet a certain criteria, a determination is made that the new changes to the source code did not introduce and/or reveal inefficient use of memory. In some embodiments, the criteria compares whether the entropy of the new binary is lower by a threshold amount from the baseline entropy evaluations. In some embodiments, the criteria compares whether the decrease in entropy between the new binary and baseline entropy evaluations exceeds a threshold amount. In various embodiments, depending on the entropy metric and thresholds utilized for the criteria determinations, the entropy metric may be a measure of entropy of the binary and/or the change in entropy of the binary from a baseline and/or past evaluation. In some embodiments, the entropy results are analyzed by Entropy Scheduler and Analyzer 101 of FIG. 1.

At 307, feedback is provided. In some embodiments, the feedback is provided directly to the software developer. In some embodiments, the feedback may be first written to a log associated with the source code check-in and subsequent build and test results. In various embodiments, the feedback includes a determination of the entropy of the source code and/or the availability of memory optimizations. For example, in the event significant redundant source code is introduced to a project, the entropy of the binary would decrease significantly such that the binary of the project meets the criteria that results in a determination that the source code contains available memory optimizations. The feedback provided at 307 may include a warning that memory optimizations are available. In some embodiments, the entropy results, entropy analysis, and/or entropy feedback is stored, for example, in a database, such as Database 109 of FIG. 1.

In some embodiments, the process of FIG. 3 is applied in the context of a core dump. For example, when a binary dumps core, the core can be transported off the working machine. In some embodiments, the core is transported over a network and processed off-site from the working machine. Once the core is transported, available memory optimizations can be identified on the core using the process of FIG. 3. For example, entropy results can be determined for the core, the results analyzed, and feedback provided based on the results.

Figure 4:
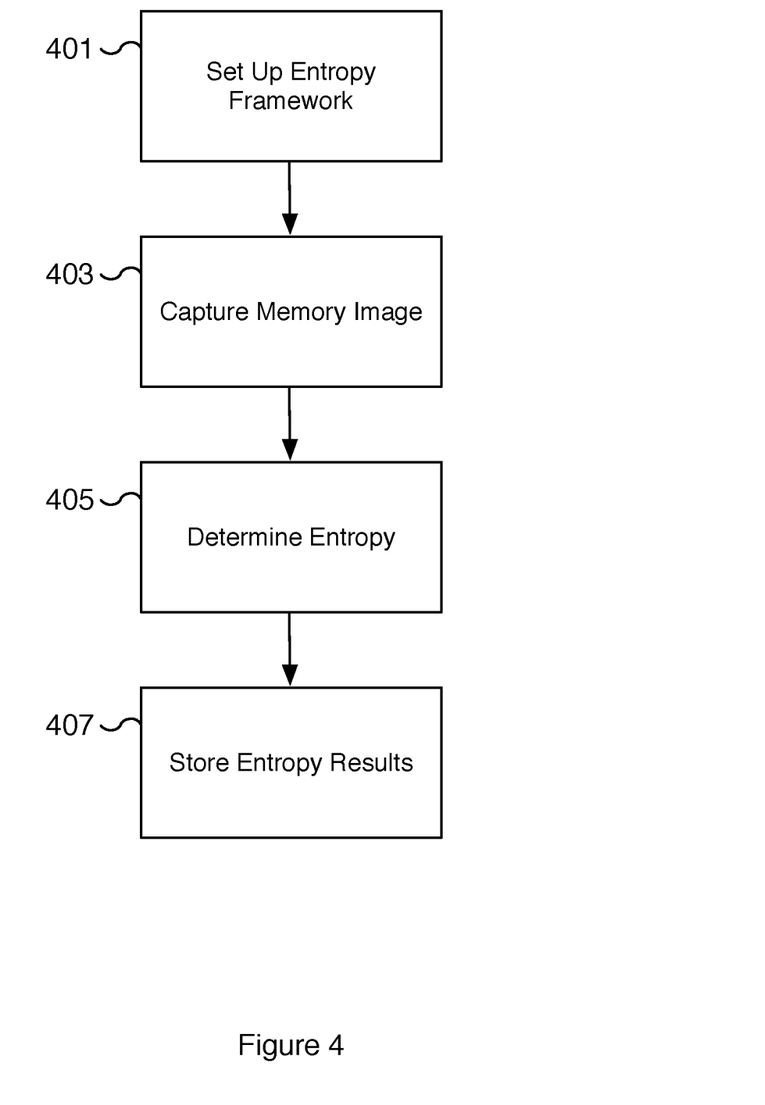
FIG. 4 is a flow diagram illustrating an embodiment of a process for determining the entropy of a running binary.

FIG. 4 is a flow diagram illustrating an embodiment of a process for determining the entropy of a running binary. In some embodiments, the process of FIG. 4 is initiated by and/or implemented by Entropy Scheduler and Analyzer 101, Manager 103, and Worker 105 of FIG. 1. In some embodiments, the process of FIG. 4 is utilized by the process of FIG. 3 to determine entropy results of a running binary. In various embodiments, the process of FIG. 4 determines the entropy of a running binary by capturing and running an entropy calculation on a memory image associated with the running binary. In various embodiments, the entropy results are stored in a database such as Database 109 of FIG. 1.

In the example shown, at 401, the framework necessary for determining the entropy of the binary is set up. In some embodiments, the binary to be tested is instrumented to run the entropy testing code. For example, the new binary may contain hooks to call the entropy test code similar to hooks for unit and regression testing. In some embodiments, the entropy is measured from the perspective of the kernel. For example, the new binary has an associated process identifier. The kernel is able to capture the memory image of the new binary to determine the entropy of the binary. In some embodiments, the kernel identifies the running binary using the process identifier of the binary. In some embodiments, existing hooks for process startup, shutdown, and other key events are utilized for determining the entropy of the binary.

In various embodiments, the entropy framework includes settings for configuring the entropy testing. For example, in some embodiments, settings exist for enabling or disabling the inclusion of copy-on-write memory portions in the entropy calculation. In some embodiments, shared memory segments may be included or excluded. In some embodiments, different memory segments, such as the text, heap, stack, and/or data segments, among others, may be included or excluded. In some embodiments, different memory segments may be configured to use different dictionaries for calculating entropy. In some embodiments, settings may be configured to include or exclude memory-mapped files. In some embodiments, the granularity of the memory block size can be configured. For example, the entropy calculation may be configured to use a 128 byte block, a 4K byte block, or other appropriate block size and the appropriate dictionary based on the block size. In various embodiments, one or more shared libraries may be included or excluded. For example, the analysis may be configured to include one or more shared libraries in the binary being analyzed.

In some embodiments, settings are used to configure the timing of when the entropy testing should be performed. For example, the timing may be configured to test the entropy of a running binary at a particular execution point (i.e., startup, shutdown, etc.), at a specific time of the day, based on processor utilization, based on user load, or based on other appropriate timing or events. In various embodiments, the settings may be configured on a test-by-test basis, based on the binary, and/or based on the run environment. In various embodiments, the framework settings are stored with the entropy results in a database such as Database 109 of FIG. 1 and may be retrieved later for additional testing.

At 403, a memory image of the running binary is captured. In some embodiments, the entire memory image associated with the binary is captured. In various embodiments, only certain segments of the running binary, such as the text segment, are captured. In some embodiments, the memory segment captured is based on the settings configured at 401.

At 405, the entropy of the captured memory or a portion of the captured memory is determined. For example, in the event the entire memory of the binary is captured, in some embodiments, the entropy of only a portion of the memory, such as the text segment, is measured. In some embodiments, the entropy of one or more segments of memory is measured separately. For example, a dictionary is created for the text segment of the binary and used to determine the entropy of the text segment by running a compression algorithm using the text segment dictionary. A separate dictionary may be created for a data segment and used to run a compression algorithm on the data segment. By utilizing different dictionaries for different segments, the entropy of each segment may be compared to the past entropy of the same segment without influence from other memory segment types. In various embodiments, an entropy measurement is calculated using an entropy algorithm. In some embodiments, the entropy algorithm is a compression algorithm. A high compression ratio for a memory segment corresponds to the memory segment having low entropy. Similarly, a low compression ratio corresponds to having high entropy.

At 407, the entropy results are stored. In some embodiments, the results are stored in a database, such as a time series database. In some embodiments, the results are stored in a database such as Database 109 of FIG. 1. In various embodiments, the entropy results are not limited to the entropy measurements and include information corresponding to the environment and build of the binary. For example, the entropy results may include a commit identifier associated with the binary, the author of the commit, the build environment, and the running environment such as the operating system and hardware specifications, among other parameters. In some embodiments, the running environment is stored such that the entropy of later binaries can be calculated using the same environment. Moreover, the entropy of the current environment may be compared to the entropy of past binaries that used the same environment.

Figure 5:
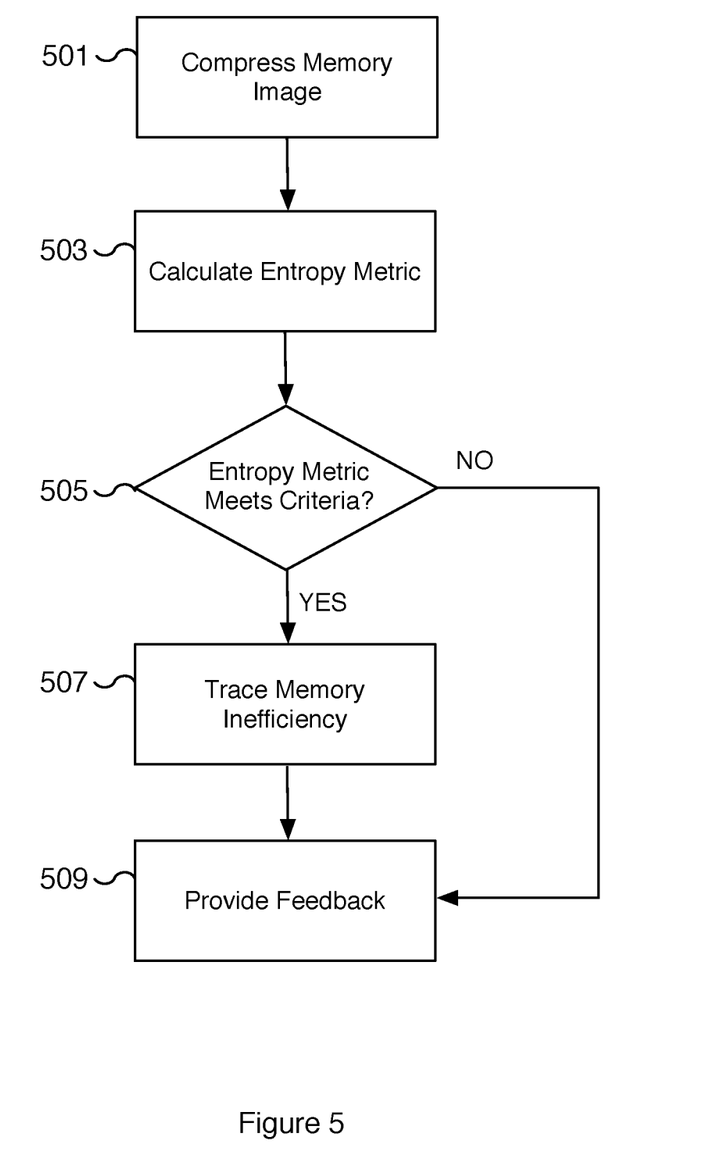
FIG. 5 is a flow diagram illustrating an embodiment of a process for identifying the availability of memory optimizations.

FIG. 5 is a flow diagram illustrating an embodiment of a process for identifying the availability of memory optimizations. In some embodiments, the process of FIG. 5 is performed by the software development environment of FIG. 1. In some embodiments, the process of FIG. 5 relies on the processes or portions of the processes of FIGS. 3 and 4 to determine the entropy of a binary and available memory optimizations.

In the example shown, at 501, a memory image is compressed. In some embodiments, the memory image is the memory image captured at 403 of FIG. 4. In various embodiments, a compression algorithm is used to determine the entropy of the memory. For example, a compression algorithm such as the one utilized by the gzip program may be used to determine the entropy of a binary. The reliance on a compression algorithm is based on the determination that a higher compression ratio reflects a lower entropy. Similarly, a binary with a memory image that contains more redundant and/or duplicative data has a lower entropy than a binary with a memory image that contains no redundant and/or duplicative data. In some embodiments, an entropy algorithm may be used that is not a compression algorithm.

At 503, an entropy metric is calculated. In some embodiments, an entropy metric is based on the compression ratio of the memory image compressed at 501. In various embodiments, the entropy metric is based on the compression ratio and converted into an entropy metric. For example, a high compression ratio results in a low entropy while a low compression ratio results in a high entropy for the binary image. In some embodiments, the entropy metric is a delta, that is, a change in entropy, between the entropy of the new binary and the baseline entropy. For example, the change between the entropy of the new binary and one or more past binaries is used to determine the entropy metric. In various embodiments, the baseline requires the entropy must be determined from a past binary run in the same environment. For example, the deltas between the entropy of the binaries running in the same or similar environments are used to remove the influence that different software and hardware environmental variables may contribute to the entropy measurements. In most scenarios, the ideal entropy of the new binary, where no memory inefficiencies are introduced, occurs when the new binary maintains the same entropy of past binaries or has a greater entropy compared to past binaries. In various embodiments, an entropy metric is calculated that corresponds to the entropy of the memory compressed at 501.

At 505, a determination is made on whether the entropy metric meets a certain criteria. In the event that the criteria is met, processing continues to 507. In the event that the criteria is not met, processing continues to 509. In the scenario where the entropy metric is a delta between current and baseline entropies, the criteria compares the entropy metric to a threshold. In the event the entropy metric, which represents a change in entropy, is lower by a threshold amount then the criteria of 505 is satisfied and a determination is made that the memory image has available memory optimizations and processing continues to 507. This scenario represents the situation where the entropy of the new binary is a threshold amount below the baseline. In the event the entropy metric is not lower by a threshold amount then the criteria is not satisfied and a determination is made that the memory image does not have available memory optimizations and processing continues to 509. This scenario represents the situation where the entropy of the new binary is similar or higher than the baseline evaluations. In various embodiments, the threshold may be a range rather than a specific cut off point. For example, the threshold may consist of multiple ranges that represent: no memory optimizations, some memory optimizations may be available, and high likelihood that memory optimizations are available. In various embodiments, the thresholds are calculated by using past baseline evaluations and entropy calculations for well-designed non-trivial binaries created using similar design principles as new binaries.

In various embodiments, the entropy metric may represent an entropy of the memory and not a delta entropy between the memory and baseline evaluation. In this scenario, the entropy metric may be compared to the baseline entropy metric and in the event the entropy metric is lower than the baseline entropy metric by a threshold amount, then the criteria of 505 is met and a determination is made that memory optimizations are available and processing continues to 507. In the event the entropy metric is not lower than the baseline entropy metric by a threshold amount, then the criteria of 505 is not met and a determination is made that memory optimizations are not available and processing continues to 509.

In some embodiments, the entropy metric calculated at 503 is the entropy of the memory image and the baseline evaluations represent the entropy of a well-designed program. In this scenario, the criteria of 505 is met when the entropy of the binary drops below a threshold amount compared to baseline entropy. In various embodiments, different memory segments may have different associated criteria based on the properties and use of the memory segment. For example, the text memory segment and heap memory segment of a binary have different properties that may result in different entropy baselines.

At 507, a trace is performed to map one or more memory inefficiencies to source code. Processing reaches 507 in the event that the criteria of 505 is met and a determination is made that memory optimizations are available. In some embodiments, the trace is performed by leveraging a source code object and/or data structure to memory mapping. For example, a trace may be performed by traversing an object graph to determine the location of the memory inefficiency. In various embodiments, different memory block sizes are utilized for tracing a potential memory optimization to source code. In various environments and languages, different trace techniques are utilized to map a low entropy memory area to source code. For example, certain C++ applications include symbol data and/or debug data for mapping the memory location to source code. In some embodiments, a garbage collection framework is utilized to trace back the memory inefficiency to source code. By identifying the portion of source code that is the cause of the memory inefficiency, a software developer can inspect the source code to determine whether the inefficiency is intentional and warranted. In the event the inefficiency is not intended, the software developer is provided with the location of the inefficiency and can implement changes to address the issue.

At 509, the feedback from the entropy analysis is presented. For example, in the event that a trace is performed, the output includes trace information identifying the source code portions associated with memory optimizations. In the event that an entropy threshold is not exceeded, the feedback may include the entropy of the binary and a message that the binary has passed the entropy test. In various embodiments, the amount and exact output of the feedback may be configured. In various embodiments, the feedback along with feedback results are stored in a database such as Database 109 of FIG. 1.

Figure 6:
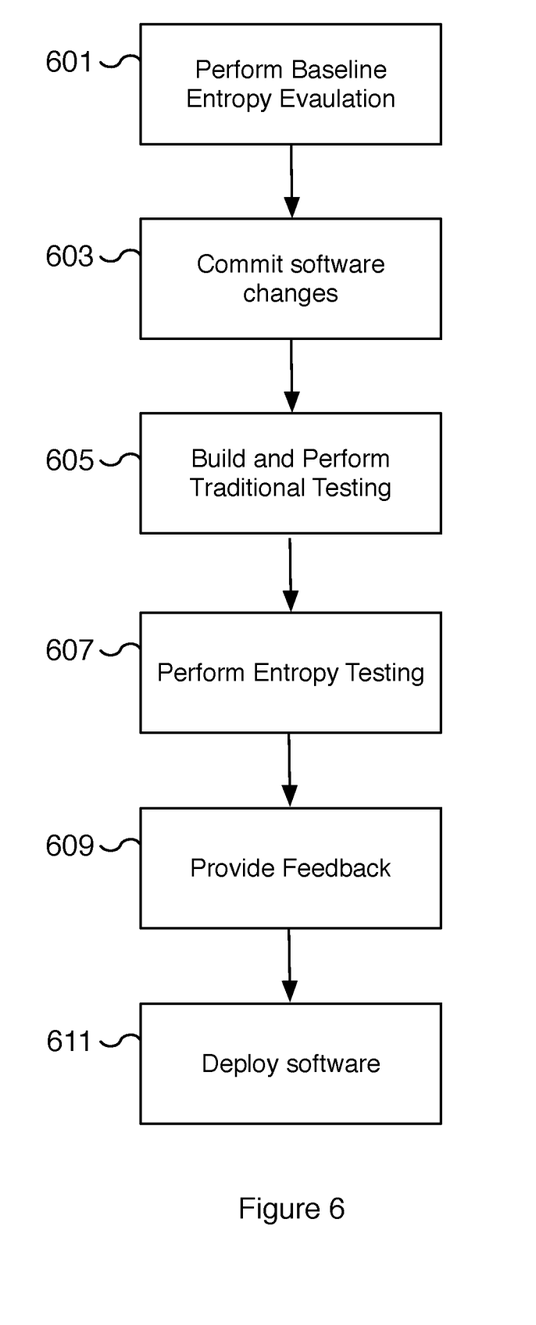
FIG. 6 is a flow diagram illustrating an embodiment of a process for identifying the availability of memory optimizations in a continuous integration environment.

FIG. 6 is a flow diagram illustrating an embodiment of a process for identifying the availability of memory optimizations in a continuous integration environment. In some embodiments, the process of FIG. 6 relies on the software development environment of FIG. 1. In some embodiments, the process of FIG. 6 utilizes the processes of FIGS. 3, 4, and 5 to determine entropy results of a running binary. In various embodiments, the process of FIG. 6 is used to implement entropy testing in a continuous integration environment. As software is developed and changes are committed to the source code project, entropy tests are performed to help identify the availability of memory optimizations. Moreover, results of each entropy test may be stored to create a history of entropy results that may be used to trace back the introduction of memory inefficiencies.

In the example shown, at 601, a baseline entropy evaluation is performed. In some embodiments, baseline evaluations are performed as described with respect to 301 of FIG. 3. At 603, software changes are committed. For example, a software developer checks in source code changes to a software project. These changes may contain additional code, which may introduce memory inefficiencies. In some embodiments, the changes may not introduce errors but instead magnify existing memory inefficiencies. For example, in the event an existing data structure contains duplicative or redundant code, new additional fields to the data structure will magnify the inefficiencies. At 605, the software project is built and traditional testing is performed. For example, as part of the continuous integration process, a check-in triggers the compilation of the new source code. The compiled binary is run against unit and regression tests. At 607, entropy testing is performed on the new binary. In various embodiments, the binary is run and the entropy associated with a memory segment of the binary is determined. The entropy of the binary is compared to a baseline entropy evaluation to determine whether an entropy metric meets a certain criteria. In the event the criteria is met, a determination is made that the new binary contains available memory optimizations. In some embodiments, the memory optimizations are traced back to a source code location. At 609, feedback is provided. In various embodiments, feedback on the entropy results is provided. For example, in the event memory optimizations are available, feedback may include a source code portion responsible for the memory inefficiencies. In various embodiments, the entropy of the binary is presented and/or the availability of memory optimizations is presented. In various embodiments, unlike traditional unit and regression tests, the entropy test does not fail and result in a failed deployment. Instead, the entropy test indicates to the developer whether or not it may be beneficial to investigate potential memory optimizations. At 611, the software is deployed. For example, a binary that has passed unit and regression testing and that has had entropy testing performed on it is deployed. In various embodiments, a binary is deployed regardless of whether memory optimizations are available. In some embodiments, the binary is deployed in stages. For example, the binary may be first deployed to a small set of users to test functionality of the binary with a smaller scale of users. In various embodiments, software may be deployed using other techniques as appropriate.

Figure 7:
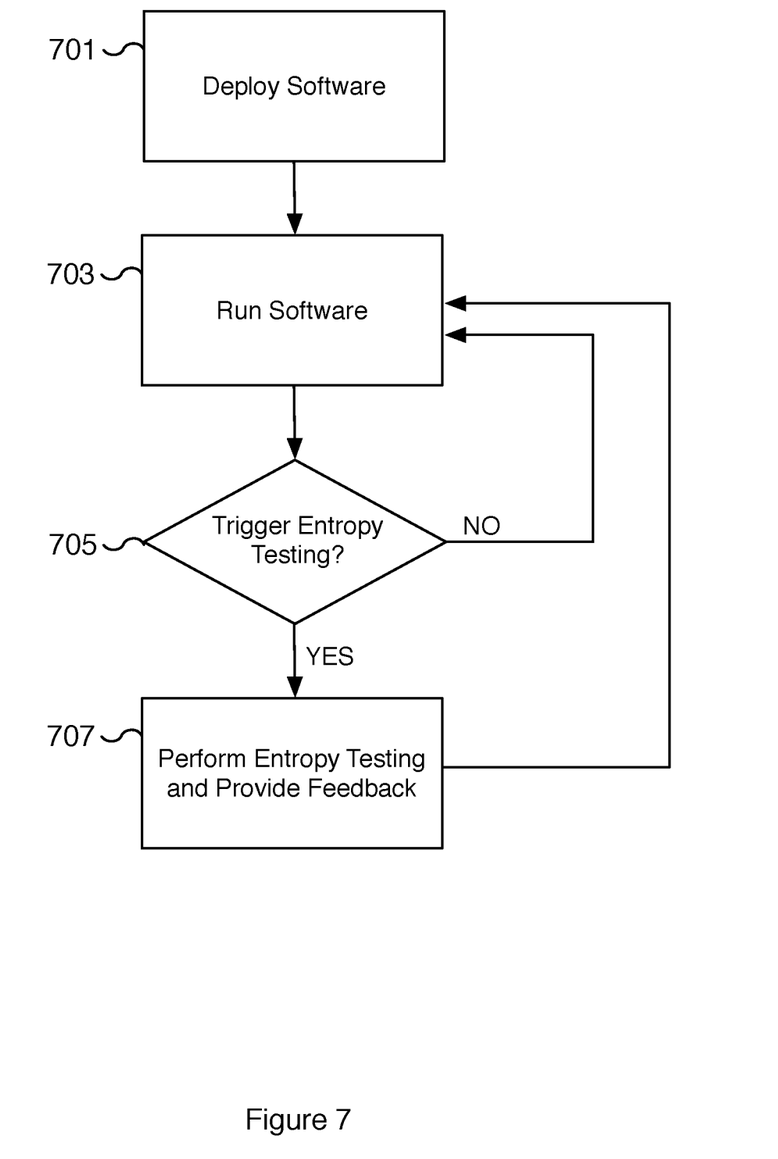
FIG. 7 is a flow diagram illustrating an embodiment of a process for identifying the availability of memory optimizations for a running binary.

FIG. 7 is a flow diagram illustrating an embodiment of a process for identifying the availability of memory optimizations for a running binary. In some embodiments, the process of FIG. 7 utilizes the processes of FIGS. 3, 4, and 5 to determine entropy results of a running binary. In various embodiments, the process of FIG. 7 is used to implement entropy testing on a deployed running binary. For example, in some scenarios, an application may have a long extended running life and is a good candidate for shutting down and restarting. Although the entire application may not be shut down, portions of the running application may be modified and upgraded. The process of FIG. 7 may be utilized to test a running binary for the availability of memory optimizations. In some embodiments, the entropy of the binary is measured from the perspective of the operating system kernel.

In the example shown, at 701, the software is deployed. For example, a long running application, such as a financial database for tracking all of a bank's transactions, is deployed. In various embodiments, the binary is deployed to one or more servers. At 703, the software is run. For example, once the software is deployed, it is executed. In some embodiments, the nature of the software does not allow the software to be readily shutdown and thus the entropy of the binary must be calculated while running.

At 705, a determination is made as to whether entropy testing is triggered. In the event entropy testing should be triggered, processing continues to 707. In the event entropy testing should not be triggered, processing continues to 703 and the binary continues to run without interruption. In various embodiments, entropy testing is triggered by key events. For example, key events may include process startup and shutdown, prior to and/or after garbage collection is performed, at a specific time of the day, based on processor utilization, based on user load, or based on another appropriate time or event. As an example, entropy testing may be triggered when user load is below a certain metric and testing would have minimal impact on users. As another example, entropy testing may be triggered when processor and/or memory utilization is minimized. In some embodiments, an administrator triggers entropy testing. For example, the testing may be triggered after a key administrative event is complete.

At 707, entropy testing is performed based on the triggering event at 705 and feedback is provided. In various embodiments, entropy testing includes providing feedback on the entropy results and/or storing the results in a database. In some embodiments, entropy testing is performed and feedback provided using the processes described with respect to FIGS. 3-5. Once entropy testing is complete and feedback is provided, processing continues to 703 and the binary continues to run without interruption.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
    obtaining a memory image of memory data content in at least a portion of computer memory utilized by a computer process during execution;
    determining an entropy associated with data redundancy of at least a portion of the obtained memory image of memory data content of a running binary;
    calculating a memory data entropy metric based at least in part on the determined entropy of at least the portion of the obtained memory image of the memory data content;
    determining based on an analysis of the memory data entropy metric whether the memory data entropy metric indicates that a memory segment of the obtained memory image of the memory data content stores redundant or duplicate data; and
    in response to determining that the memory segment stores the redundant or duplicate data, identifying a computer code portion associated with the memory segment that stores the redundant or duplicate data.

2. The method of claim 1, wherein the computer code portion associated with the memory segment that stores the redundant or duplicate data was identified in response to a determination that the memory data entropy metric meets a criterion.

3. The method of claim 2, wherein the criterion is based on an entropy threshold range.

4. The method of claim 1, wherein the at least portion of the obtained memory image of memory data content corresponds to a text segment, a data segment, a stack segment, or a heap segment of the computer process.

5. The method of claim 1, wherein calculating the memory data entropy metric utilizes a compression algorithm.

6. The method of claim 1, wherein calculating the memory data entropy metric is based on a configuration that includes settings for enabling or disabling copy-on-write memory portions, shared memory segments, or memory-mapped files.

7. The method of claim 1, wherein the calculating of the memory data entropy metric is performed using a continuous integration environment.

8. The method of claim 1, wherein the calculating of the memory data entropy metric is performed from a perspective of an operating system kernel.

9. The method of claim 1, wherein the calculating of the memory data entropy metric utilizes an operating system kernel hook.

10. The method of claim 1, further comprising performing a baseline entropy evaluation.

11. The method of claim 10, wherein the baseline entropy evaluation utilizes a non-trivial binary created using similar design principles as the computer process.

12. The method of claim 10, wherein the baseline entropy evaluation utilizes a running environment matching the computer process.

13. The method of claim 10, wherein calculating the memory data entropy metric further comprises comparing the memory data entropy metric to the baseline entropy evaluation.

14. The method of claim 1, further comprising storing the memory data entropy metric and a commit identifier corresponding to a source code change for the computer process in a database.

15. The method of claim 1, wherein identifying the computer code portion associated with the memory segment that stores the redundant or duplicate data utilizes an object to memory mapping.

16. The method of claim 1, wherein identifying the computer code portion associated with the memory segment that stores the redundant or duplicate data utilizes a garbage collection data structure.

17. The method of claim 1, wherein calculating the memory data entropy metric utilizes a dictionary based on a memory segment type.

18. The method of claim 17, wherein the memory segment type includes one of a text segment, a data segment, a stack segment, or a heap segment.

19. A system comprising: a processor; and a memory coupled with the processor, wherein the memory is configured to provide the processor with instructions which when executed cause the processor to:
    obtain a memory image of memory data content in at least a portion of computer memory utilized by a computer process during execution;

determine an entropy associated with data redundancy of at least a portion of the obtained memory image of memory data content of a running binary;

calculate a memory data entropy metric based at least in part on the determined entropy of at least the portion of the obtained memory image of the memory data content;

determine based on an analysis of the memory data entropy metric whether the memory data entropy metric indicates that a memory segment of the obtained memory image of the memory data content stores redundant or duplicate data; and in response to determining that the memory segment stores the redundant or duplicate data, identify a computer code portion associated with the memory segment that stores the redundant or duplicate data.

20. A computer program product, the computer program product being embodied in a non-transitory computer readable storage medium and comprising computer instructions for:

obtaining a memory image of memory data content in at least a portion of computer memory utilized by a computer process during execution;

determining an entropy associated with data redundancy of at least a portion of the obtained memory image of memory data content of a running binary;

calculating a memory data entropy metric based at least in part on the determined entropy of at least the portion of the obtained memory image of the memory data content;

determining based on an analysis of the memory data entropy metric whether the memory data entropy metric indicates that a memory segment of the obtained memory image of the memory data content stores redundant or duplicate data; and in response to determining that the memory segment stores the redundant or duplicate data, identifying a computer code portion associated with the memory segment that stores the redundant or duplicate data.

* * * * *